Jan. 14, 1958　　　　H. ERDMANN　　　　2,819,818
DISPENSERS FOR RETAINING RINGS
Filed July 14, 1952　　　　　　　　　　5 Sheets-Sheet 1

INVENTOR
HANS ERDMANN,
BY
ATTORNEY

Jan. 14, 1958        H. ERDMANN        2,819,818

DISPENSERS FOR RETAINING RINGS

Filed July 14, 1952        5 Sheets-Sheet 3

INVENTOR
HANS ERDMANN

BY
ATTORNEY

Jan. 14, 1958  H. ERDMANN  2,819,818
DISPENSERS FOR RETAINING RINGS
Filed July 14, 1952  5 Sheets-Sheet 4

INVENTOR
HANS ERDMANN,
BY
ATTORNEY

Jan. 14, 1958  H. ERDMANN  2,819,818
DISPENSERS FOR RETAINING RINGS
Filed July 14, 1952  5 Sheets-Sheet 5

INVENTOR
HANS ERDMANN

BY

ATTORNEY

United States Patent Office 2,819,818
Patented Jan. 14, 1958

2,819,818

DISPENSERS FOR RETAINING RINGS

Hans Erdmann, Maplewood, N. J., assignor to Waldes Kohinoor, Inc., Long Island City, N. Y., a corporation of New York Application July 14, 1952, Serial No. 298,869

4 Claims. (Cl. 221—220)

This invention relates to improvements in dispensers for retaining rings, and more particularly to an improved device for effecting controlled delivery of single retaining rings from a stack or column thereof arranged on a rod or the like, through the use of a special tool, known as an applicator, which also functions as a ring handling and ring seating tool.

In general, retaining rings are designed, when seated in a groove provided therefor in a carrier shaft or housing, to provide an artificial shoulder for securing a machine part abutting the ring against axial displacement. The so-called open retaining ring, in particular, is adapted to be assembled in the plane of its seating groove; that is to say, by virtue of the wide gap between its ends, it can be spread over the shaft on which it is to be assembled directly in the plane of its groove. The present invention is concerned with a means for dispensing a type of external open retaining ring which is characterized by three lugs projecting radially inwardly from its inner edge, one at the ring middle portion, and the other at its free ends, whose inner arcuate edges abut the groove bottom with spring pressure sufficient to firmly seat the ring. Such an open ring enjoys great popularity and is used by industry in considerable volume.

However, the mass assembly of such a ring as entailed in production line methods, for example, requires much time and skill. To simplify handling of the ring prior to and during the final assembly thereof in its groove, it has been suggested previously to stack a plurality of the rings either vertically or horizontally, so that they form a column, and to withdraw single rings as needed from this column by means of a special tool, the so-called applicator, which serves also as a tool for handling the ring between withdrawal and assembly, and as a means for assembling the ring in its groove as well. A ring dispensing device and an applicator for use therewith has been disclosed in Patent No. 2,483,379, dated September 27, 1949, to Brell, of which Fig. 8 shows a column of rings arranged to be dispensed singly by an applicator as shown in Fig. 1 thereof. In general, this applicator comprises an elongated shank which provides a tool handle, whose working part or head is made resilient by a longitudinal slot defining two prongs which terminate in segmental jaws which together form a half-circular ring-gripping head adapted to grip the endmost (or lowermost) ring of the stack, thereby to effect its withdrawal, and to hold it during handling preliminary to and during its assembly in the shaft groove. Moreover, the working part or head of the tool is provided with a ring backing flange designed to underlie the ring body gripped thereby and a generally semi-circular gripping edge adapted to engage the ring along its outer periphery. By this tool-head structure, it is intended that the ring body shall be supported from beneath, against forces which are usually applied in downward direction against the upper uncovered face of the ring body.

When assembly of the retaining rings on a shaft or shafts is being effected on a mass or production line scale, the operations of dispensing, handling, and the actual placing of the rings in their grooves with some degree of force must be performed in a minimum of time. In dispensers wherein the rings are stacked in a vertical column on a similarly disposed rod, according to prior designs of ring dispenser, a difficulty was introduced, due to the fact that the applicator was required to be held during the ring withdrawal operation in the position described above, namely, with the ring backing flange disposed downwardly, leaving the upper face of the ring body uncovered. However, it frequently happens that the shaft groove in which the ring is to be assembled is disposed below the level of the encircling machine part to be secured, so that the latter must be pressed down, usually against the action of a spring, to render the groove accessible. There are other applications wherein the groove is above the upper level of the machine part, but very close to the upper edge of said part. In all such and numerous other applications it is necessary that the applicator be held with its backing flange disposed upwardly so that it overlies the ring body either to prevent force from below acting on the ring to unseat it from the applicator head, or to position the ring as close as possible to the upper line of the machine part, as is required by the close proximity of the shaft groove thereto.

Thus, for all such applications, a construction of dispenser requiring that the applicator be so held that its ring-backing flange is disposed downwardly rather than upwardly is disadvantageous, because the operator, following withdrawal of a ring from the dispenser, must turn the applicator before he initiates the ring assembling operation, which is cumbersome and time-consuming. And, should the operator forget to turn the applicator, or inadvertently turn it over more than once, he may fail to complete the ring assembly operation within the limted time allotted him, with the result that the shaft may move past the operator's station before the ring assembling operation can be completed.

With the above in mind, a principal object of this invention is to provide a retaining ring dispensing device of a type in which ring withdrawal is effected by an applicator as aforesaid, which is so constructed and arranged that the applicator must be held with its ring backing flange disposed upwardly rather than downwardly, as heretofore, so that no subsequent turning of the applicator is required to effect ring assembly in applications demanding that the under face of the ring be uncovered.

A further general object of the invention is to provide a retaining ring dispensing device, as aforesaid, which reduces the dispensing of a retaining ring therefrom to a simple push and pull movement of the applicator, and which provides that the endmost or lowermost retaining ring of a column thereof maintained in the device will be automatically presented to the applicator, and that the latter will always securely grip said lowermost retaining ring as required for easy removal.

Another object of the invention is the provision of a retaining ring dispenser of a type wherein a plurality of retaining rings is maintained in stack formation on a vertical rod which is anchored in a base, wherein the working surface of the base has two portions of different levels, the difference in the levels corresponding to the axial thickness of a single retaining ring. This arrangement makes it possible for the applicator to be disposed on the lower level at the initiation of its push movement without being hampered by the column of rings which is supported on the upper level, and/or it also permits movement of the applicator to the upper level where it clamps the bottommost ring of the column thereof while raising all rings above the same, thus insuring controlled withdrawal of a single ring from the stack or column thereof.

A further object of the invention is the provision of a retaining ring dispenser incorporating a slide member operating in a guideway provided in the top of the dispenser base, which slide member is so arranged that, when actuated by the applicator, it effects automatic transfer of the lowermost ring of a column or stack thereof to a position in which it can be gripped or clamped by the applicator at the initiation of the next ring-withdrawal operation.

Yet another object of the invention is the provision of a retaining ring dispenser incorporating a linkage system so arranged as to be actuated by the applicator and which, when so actuated, forcibly presses the lowermost ring of the column into the working or gripping head of the applicator.

A still further object of the invention is the provision of a retaining ring dispenser incorporating a novel pinion and rack arrangement actuable by the applicator for pressing the lowermost ring of the column thereof into the gripping portion of the applicator.

The above and other objects and features of advantage of a retaining ring dispenser according to the invention will appear from the following detailed description thereof, in which reference is had to the accompanying drawings illustrating various preferred forms of dispensers by which the desirable objectives of the invention may be achieved. In the accompanying drawings.

Figure 9:
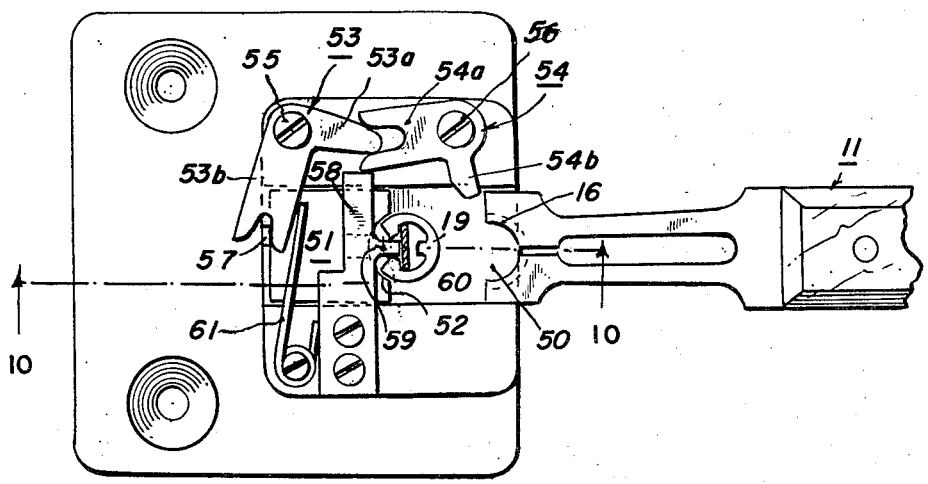
Figs. 9 and 10 are plan and section views generally corresponding to Figs. 1 and 2 which illustrate still another form of retaining ring dispenser according to the invention, the views illustrating the slide and linkage system in their normal or rest positions.
Figure 10:
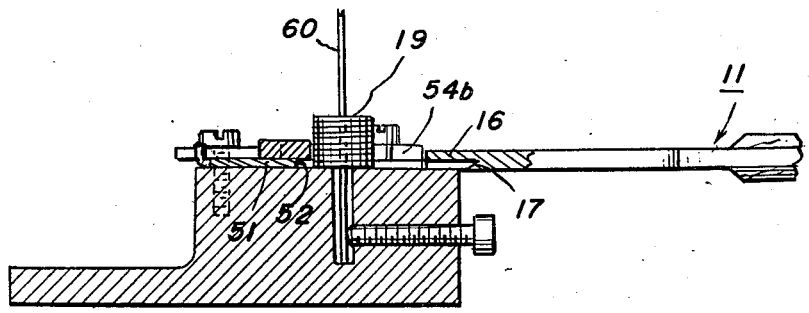
Figure 11A:
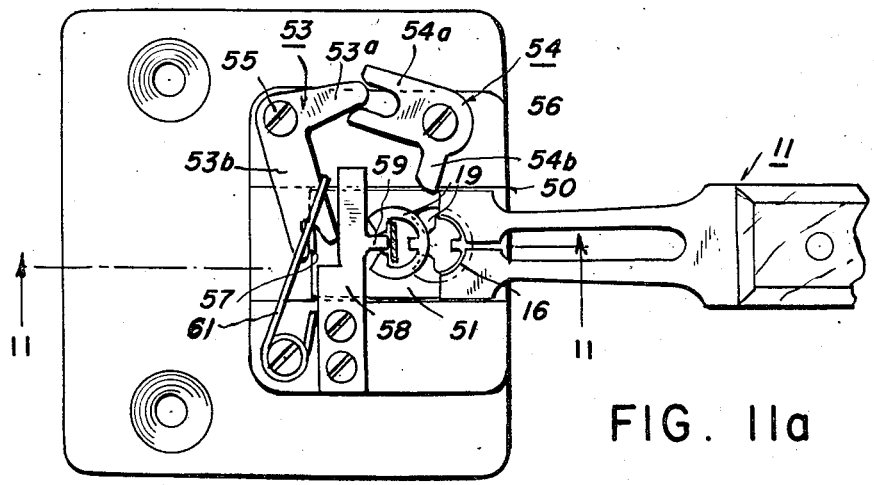
Figure 11B:
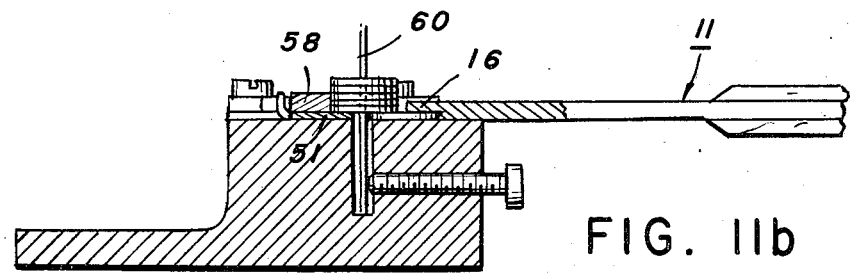
Figure 12:
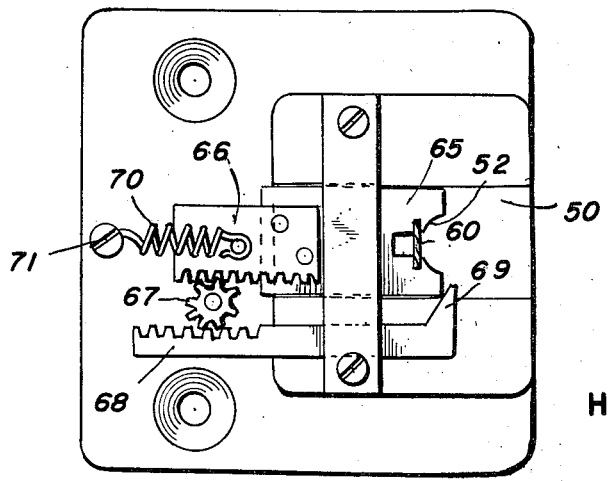

Figs. 11a and 11b are views corresponding to Figs. 9 and 10, respectively, which illustrate the manner in which the linkage system is actuated by the applicator to in turn actuate the slide member; and Fig. 12 is a plan view of a further form of retaining ring dispenser which incorporates the slide movement characterizing the form of dispenser shown in Figs. 9–11b, but employing a rack and pinion means for its actuation in place of the aforesaid linkage system.

Referring to Figs. 1–5b of the drawings, numeral 10 generally designates one form of retaining ring dispenser according to the invention, which is adapted to be actuated by a so-called applicator tool 11. The latter is of the type disclosed in Patent No. 2,483,379 to Brell, aforesaid, and comprises a shank 12 sub-divided longitudinally into resilient arms 12a, 12b by a slot 13, the arms terminating in a clamping portion provided by segmental jaws 14, 15 which together define a semi-circular recess for receiving a retaining ring and which is slightly undersize with respect to said ring. When seated in said recess, the retaining ring is supported by a backing flange 16 which, when the applicator is held with its recess opening downwardly as best seen in Fig. 4b, is disposed to overlie the ring body whose outer edge is spring-gripped by the undercut recess edge 17. It is a feature of the invention that the applicator may be held in its Fig. 4b position at all times; that is to say, during its actuation of the dispenser, during subsequent handling of the ring gripped thereby, and during forcible insertion of the ring in its shaft groove, it being understood that when the ring is so held a force may be applied to its under face consequent to the ring being backed from above by the backing flange 16.

Figure 3:
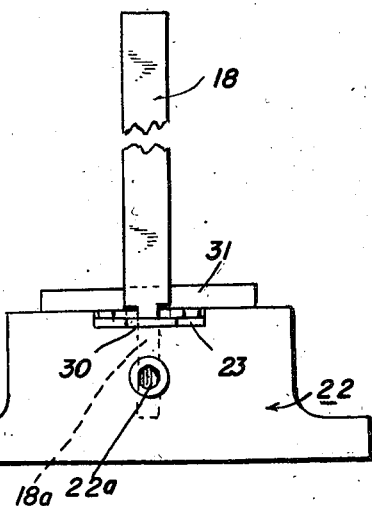
Fig. 3 is an end view of the applicator, looking into the right end of Fig. 1.

To make this possible, the invention provides a special construction of dispenser as shown, according to which a plurality of retaining rings to be dispensed may be stacked in a column on a vertical rod 18 extending upwardly from the dispenser base to be described. More particularly, the retaining rings to be dispensed, which are designated 19 in the several views, are of the open type as best seen in Fig. 4, it being observed that the open retaining ring subtends an arc only somewhat greater than 180° so as to have a wide gap 20 between its ends, being moreover provided with an inwardly directed middle lug or projection 19a and with end lugs 19b, 19c, whose inner arcuate edges bear with spring pressure against the bottom of a groove in a shaft when the ring is properly assembled therewith. It is to be further understood that such a ring may be assembled in its shaft groove by the use of the applicator 11 by which it is withdrawn from the dispenser, since the applicator is designed to push the ring over the shaft in the plane of its seating groove. As best seen in Fig. 3, the vertical rod 18 throughout the major portion of its length has substantial width dimension which is such that when a plurality of open retaining rings of the character described are threaded thereon, the edges of the rod engage behind the ring end-lugs 19b, 19c, thus to maintain the rings in a more or less fixed vertical column.

Figure 1:
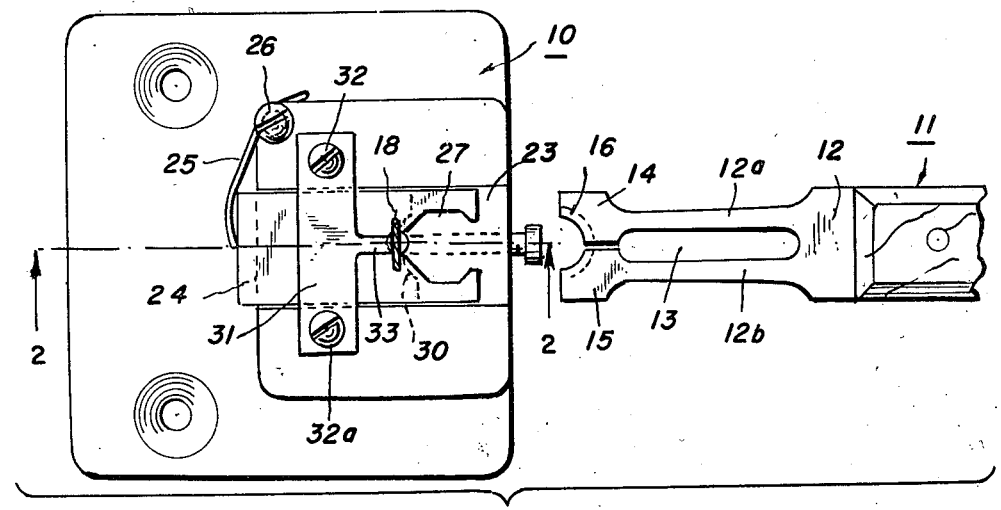
Fig. 1 is a plan view of one form of retaining dispenser according to the invention, the view illustrating the applicator employed to actuate it.

The rod 18 may be anchored in a slot 21 of the dispenser base 22, wherein it is held by a set screw 22a. As best seen in Fig. 1, the dispenser base 22 may have rectangular form, and it is provided with an upstanding block-like portion which is provided in its upper horizontal surface with a slideway 23. This slideway has width slightly greater than the overall width of the jaws 14, 15 of the applicator 11, so that the latter can move into and travel along said slideway, wherein it is guided by the slideway side walls.

Mounted for sliding movement within the slideway 23 is a slide 24 which is urged to its normal or rest position by a spring 25 reactive on its rear edge and which is fixed to the base by a screw 26. The slide 24 is provided in its forward end portion with an open-ended recess 27, of size such that it may comfortably accommodate one of the rings 19 with some play.

Figure 2:
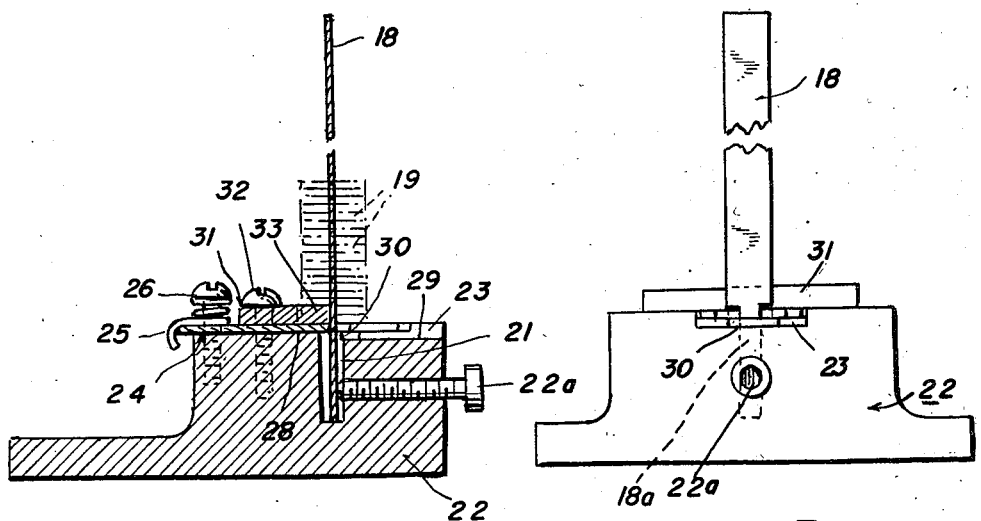
Fig. 2 is a section taken through the applicator along line 2—2 of Fig. 1.

It is a particular feature of the invention that the bottom wall of the slide-way 23 is arranged at two elevations, there being an upper level portion 28 and a lower level portion 29, the difference in elevation between said portions corresponding to the axial thickness of a ring 19. As best seen in Fig. 1, the upper level portion 28 is provided with a recess or cut-out 30 of arcuate shape which opens into the lower level portion 29 and into which a portion of a ring 19 resting on said lower level portion is adapted to extend, the recess thus serving to locate said ring in a more or less fixed position on the lower level surface 29. Referring to Fig. 2, the slide 24 is supported on the upper level portion 28 and, by virtue of the aforesaid difference in levels, the slide may move freely over a ring 19 resting on the lower level surface 29. Disposed above the slide 24 and bridging the slideway 23 is a cross member 31 serving as a hold-down or top closure for the slide. The cover member is secured by bolts 32, 32a to the top surface of the base, and is provided with an integral lug or protrusion 33 which is adapted to extend into the gaps 20 of the lowermost rings 19 disposed on the rod 18, thus to maintain them in correct position.

Figure 4A:
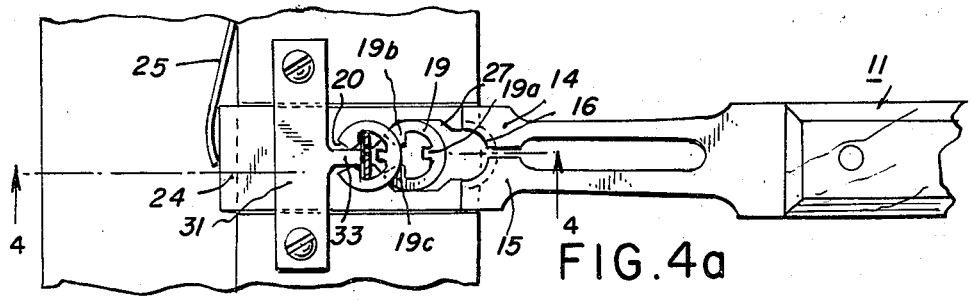
Figs. 4a and 4b are partial plan and section views, respectively, illustrating the applicator cooperated with the dispenser, with the slide which supports the ring column in rest position, and with one ring presented to the applicator.
Figure 4B:
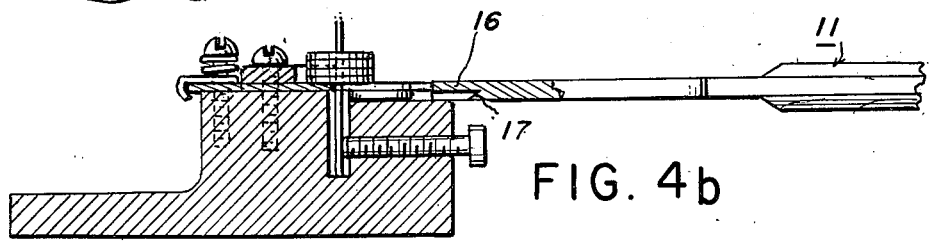

Referring to Figs. 4a and 4b which show the slide 24 in its rest position, and the applicator 11 inserted in the slideway 23 but as yet exerting no push on said slide, it will be observed that the column of retaining rings is supported on the slide, and that one retaining ring is disposed on the lower level portion 29 of the slideway, with a portion of the ring extending into the cut-out 30 of the upper level portion, all as results from an earlier dispensing operation. Upon simple push motion being given the applicator 11, the latter moves farther into the slideway 23 and, in so doing, the forward edge of its backing flange 16 engages the slide 24 and pushes it rearwardly against the bias of spring 25. Since the recess-defining edge 17 provided in the jaws 14, 15 of the applicator is below the backing flange 16 of the applicator, and in horizontal alignment with the ring resting on the lower level portion 29 of the slideway bottom, continued push movement applied to the applicator causes the jaws 14, 15 to be spread slightly over said ring and thereupon to firmly clamp the ring between said jaws, it being understood that the ring is held against rearward movement with the tool consequent to its engagement with the shoulder-like edge which defines the aforesaid cut-out 30.

Figure 5A:
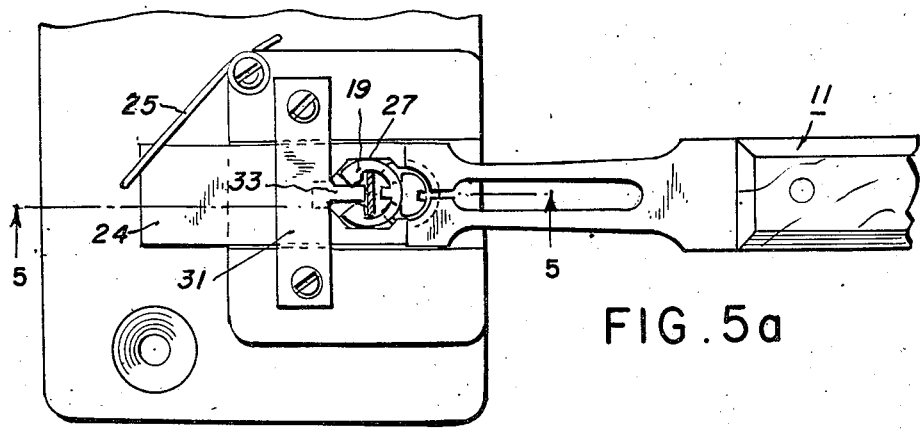
Figs. 5a and 5b are views similar to Figs. 4a and 4b, illustrating the slide in its extreme back position to which it has been actuated by push movement of the applicator.
Figure 5B:
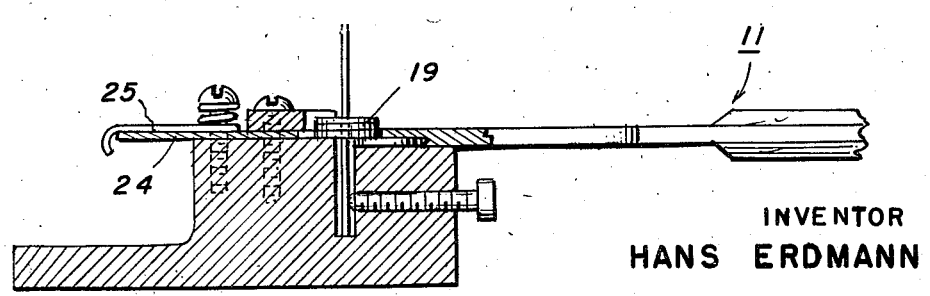

Upon the applicator reaching the limit of its push movement, as determined by the ring seating in the tool recess 17, the slide has been also actuated to its position shown in Fig. 5a, in which slide opening 27 is disposed directly below the column of rings which was previously supported by the slide, resulting in the lowermost ring of the column entering said slide opening. Now, when the applicator 11 is withdrawn from the slideway, it not only carries with it the ring 19 previously supported on the lower level surface 29 of said slideway, but it also enables the slide to retract under the urge of spring 25, such movement forcing the ring previously received in the slide recess 27 to move over and drop on to the said lower level surface 29, where it remains in ready position for the next dispensing operation. The aforesaid movement of a ring received in the slide recess 27 with the slide requires that said ring free itself from the stack rod 18. For this purpose, the lower end 18a of the rod, i. e. the height portion thereof extending directly above the upper level surface 28 for at least the thickness of the ring, has reduced width which is somewhat less than the width of the ring gap. Thus, a ring seated in the slide recess 27 may be withdrawn from the stack due to the ability of the reduced width portion 18a of the rod to move relatively through the gap between the open ends of said ring.

It will be seen that a dispenser constructed as in the foregoing not only provides for simple and controlled withdrawal of single retaining rings from a stack thereof, but it also provides for actuation by an applicator turned so that its backing flange is disposed upwardly, thereby leaving uncovered the under face of each ring as it is dispensed. Thus, for applications requiring that the ring must be backed from above in its assembly, the operator is not required to turn the tool over to dispose the backing flange upwardly, as was an incident to the construction of prior retaining ring dispensers. It will also be observed that the dispensing operation may be effected with speed and dispatch, since the operator is required only to push the tool into the slideway 23 of the dispenser base until it grips the ring resting on the lower level portion 29 of the slideway, and then to withdraw the applicator, such movements being of simple push-pull character. Moreover, it will be seen that the operation of gripping one ring results in movement of the lowermost ring of the column proper to a position in which it is ready for the next dispensing operation; that is to say, each dispensing operation conditions the device for the next dispensing operation.

Figure 6:
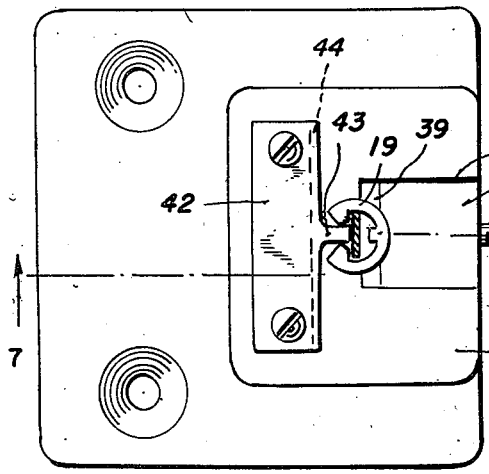
Figs. 6 and 7 are plan and section views corresponding generally to Figs. 1 and 2, and which illustrate a modified form of applicator.
Figure 7:
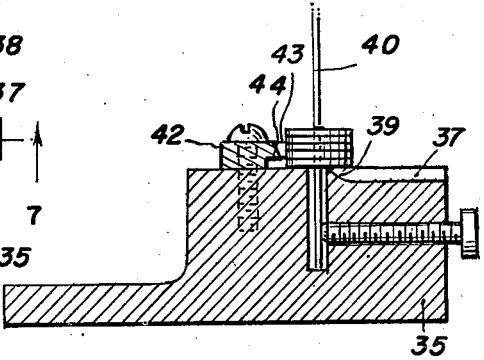

Referring to the modified form of dispenser illustrated in Figs. 6–8b, such eliminates the slide 24 according to the prior described modification. Instead, the device is constructed in such manner that the push movement of the applicator 11 causes it to change elevation and, in so doing, to directly grip the lowermost retaining ring 19 of a column of such rings maintained on the dispenser base 35, while at the same time raising the other rings of the column slightly to insure controlled withdrawal of a single ring. Such is achieved in part by forming the upper or working surface of the block-like dispenser base 35 with two different elevations, the difference in elevation corresponding to the axial thickness of a ring 19 as heretofore, of which the higher level portion is designated 36 and the lower level portion is designated 37. As best seen in Figs. 6 and 7, the lower level portion 37 constitutes the bottom wall of a channel 38 corresponding to the slideway 23 of the prior described form in that it provides a guideway for the applicator 11. The aforesaid higher and lower level portions 36, 37 are connected by an inclined way 39 which is disposed somewhat forwardly of the rod 40 on which the retaining rings are stacked. A cross member 42 extends transversely to the rear of the rod 40 and is provided with an integral lug 43 which functions like the lug 33 of the cover plate 31 of the prior modification in maintaining a plurality of the lowermost rings of the column in correct position. Said cross member is undercut along its forward edge to provide an overhanging ledge 44 which is spaced from the upper level surface 36 of the base a distance corresponding to the thickness of a ring 19. Thus, upon the lowermost ring of the column being pushed rearwardly the small amount such that a portion of its edge moves beneath the ledge 44, the latter functions to hold said ring against upward movement.

Figure 8A:
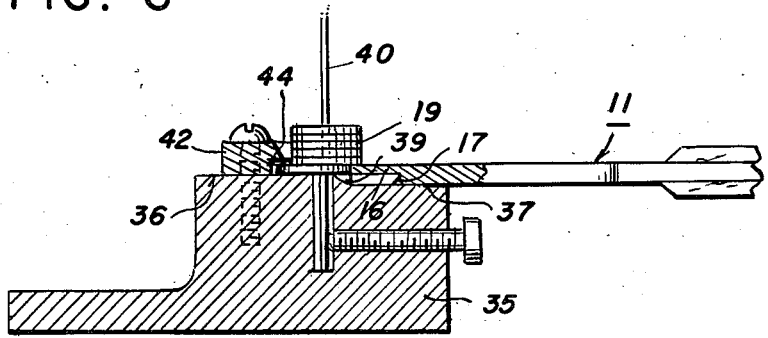
Figs. 8a and 8b are section views similar to Fig. 7, illustrating the action of the applicator in gripping the lowermost ring of a column or stack thereof maintained by the dispenser consequent to push movement of the applicator.
Figure 8B:
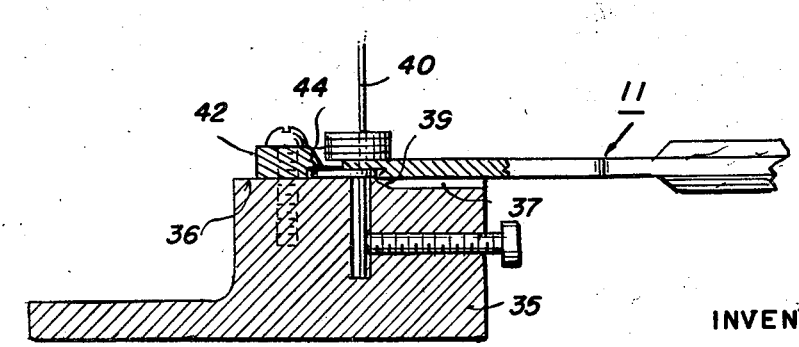

In the modified form of dispenser under description, the applicator 11 is inserted into the guide-way 38 and a rearward push is applied thereto. Such results in the first instance and as seen in Fig. 8a, in the forward edge of the ring backing flange 16 of the applicator engaging the lowermost ring and forcing a portion thereof beneath the overhanging ledge 44 of the cross member 42. Continued push movement of the applicator causes the same to change elevation in climbing up the inclined way 39, such resulting (Fig. 8a) in the backing flange engaging the next higher retaining ring of the column from beneath and lifting the column, of course excluding the lowermost ring restrained by the ledge 46. In the final push movement applied to the applicator, the lowermost ring held by the ledge 44 enters the ring recess 17 of the applicator wherein it is firmly held during withdrawal of the applicator. As the latter moves from beneath the column, the column lowers to the level of the higher level portion 36 of the base top on which it is supported for the next dispensing operation.

Referring now to the further embodiment of a dispensing device according to the invention which is illustrated in Figs. 9–11b, such is characterized by a slide as in the first described form, but the movement of the slide is reversed, and it functions to press the lowermost retaining ring 19 of the column thereof into the ring-seating recess 17 of the applicator. Such is achieved by providing in the upper surface of the base a slideway 50, in which the slide 51 is mounted for reciprocatory travel. By reference to Fig. 10, the thickness of the slide corresponds to the axial thickness of a ring of the column thereof which directly rests on the bottom of the slide-way 50, and the slide is provided at its forward edge with an arcuate recess 52 of curvature corresponding to ring curvature, and whose defining edge is adapted to abut the ring as the slide is actuated to the right (Fig. 11b position).

The slide 51 is adapted to be actuated toward the applicator 11 as the latter is inserted in the slideway and a push applied thereto. This is achieved by a linkage system comprising reversely arranged bellcrank levers 53, 54 turning on fulcrums (securing screws) 55, 56, respectively, the levers being interconnected as by the end of one arm 53a of the lever 53 seating in a slot provided in the end of the adjacent arm 54a of the lever 54. The other arm 54b of said lever 54 extends into the slideway 50, and terminates in an end shaped as a detent which is positioned to be engaged by the front edge of the backing flange 16 of the applicator, upon the latter being inserted into the slideway. The other arm 53b of the lever 53 terminates in a fork adapted to straddle an upturned lug 57 formed at the rear end of the slide 51. The slide 51 is covered by a cross arm 58 provided with a forwardly extending lug or protrusion 59 which extends into the gaps 20 of the lowermost rings of a column thereof supported on the base and held thereon by the vertical rod 60 corresponding to the rods 18 and 40 of the prior described forms.

Fig. 9 illustrates the slide and linkage mechanism in its normal or rest position, in which the arcuate edge of the recess 52 of the slide 51 is disposed a small distance to the rear of the lowermost ring 19 of the column thereof. Upon the applicator 11 being inserted in the slideway 50 and a push force imparted thereto, it engages the detent end of arm 54b of the lever 54 and actuates the latter in clockwise direction, the interconnection between the levers 54, 53 resulting in counterclockwise movement of the other lever 53 and, through the latter's connection with the slide 51, forward movement of the slide in the direction of the applicator. Consequent to such forward motion of the slide, it picks off the lowermost ring from the column thereof and presses it into the ring recess 17 of the applicator. Upon withdrawal of the latter, together with the ring gripped thereby, the slide retracts to its normal or rest position under the bias of spring 61 whose free end engages against the arm 53b of the lever 53 as shown.

The further form of dispenser illustrated in Fig. 12 employs a slide 65 corresponding structurally and functionally to the slide 51 of the Figs. 9–11b modification. However, the slide 65 is actuated forwardly or toward the ring clamping portion of the applicator by a rack and pinion means, rather than through the previously described linkage system. Such means illustratively comprises a rack member 66 affixed to and projecting rearwardly from the rear end of the slide 65, the rack teeth thereof meshing with the teeth of a pinion 67, which latter also meshes with an actuating rack 68 having one end projecting forwardly and terminating in an offset detent 69 which extends into the path of movement of the forward edge of the ring backing flange 16 of the applicator 11.

Normally, the slide 65 is maintained in its normal or rest position by means of a tension spring 70 reactive between the rack member 66 and a fixed point 71 on the base. However, upon the applicator 11 being inserted in the slideway and push movement imparted thereto, the ring gripping end of the applicator engages detent 69, causing it, together with the rack member 68, to move rearwardly. Such rearward movement imparts forward or advance movement to the rack member 66, and hence to the slide 65, which is utilized to press the lowermost ring of the column thereof into the ring gripping recess 17 of the applicator, as with the Figs. 9–11b form of dispenser.

Without further analysis, it will be appreciated that all forms of retaining ring dispenser described in the foregoing and as exemplified in the accompanying drawings achieve the major objectives of the invention, in that the design of all such forms is such that they must be operated with the ring applicator tool held with its ring-backing flange 16 disposed upwardly, thereby relieving the operator of any requirement to turn the tool in the interval between the operations of withdrawing the ring from the dispenser and of assembling it on its shaft, which is a feature of advantage in ring assembling operations requiring that the uncovered or unbacked surface of the ring face downwardly. Moreover, all of the described forms of ring dispensers are characterized by simple and foolproof construction and by an operation which entails merely a straight push-pull movement of the applicator. It will also be observed that dispenser operation as described results in a controlled, single delivery of retaining rings from a stack or column of such rings, and in the dispenser being always conditioned for the next dispensing operation.

As many changes could be made in carrying out the above construction without departing from the scope of the invention, it is intended that all matter contained in the above description or shown in the accompanying drawings shall be interpreted as illustrative and not in a limiting sense.

I claim:

1. A retaining ring dispenser comprising a base having a horizontal upper surface and a rod extending therefrom for holding a plurality of retaining rings supported in stack formation on said base, a slideway formed in said upper surface extending beneath said stack, said slideway having different elevations and the difference in elevation equaling the thickness of a ring, a slide mounted to slide in said slideway portion of greater elevation and being adapted upon actuation in one direction of movement along the slideway to shift the lowermost ring of the stack to a position on the guide-way portion of lesser elevation, spring means for actuating said slide in said one direction, said slideway also providing a guideway for a ring dispensing tool having ring clamping and backing portions arranged at different levels and the difference in said levels corresponding generally to the difference in elevation of the slideway portions, whereby said slide is actuable in the opposite direction along said slideway by the ring backing portion of the tool.

2. A retaining ring dispenser comprising a base having a horizontal upper surface and a rod extending therefrom for holding a plurality of retaining rings supported on said base in stack formation, a slideway formed in said upper surface extending beneath said stack, said slideway having different elevations and the difference in elevation equaling the thickness of a ring, a slide mounted to slide in said slideway portion of greater elevation and being adapted upon actuation in one direction of movement along the slideway to shift the lowermost ring of the stack to a fixed position on the guideway portion of lesser elevation, spring means for actuating said slide in said one direction, said slideway also providing a guideway for a ring dispensing tool having ring clamping and backing portions arranged at different levels and the difference in said elevations corresponding generally to the difference in elevation of the slideway portions, whereby said slide is actuable in the opposite direction along said slideway by the ring backing portion of the tool.

3. Apparatus for dispensing retaining rings comprising a ring in combination, dispensing device and a tool for actuating the same, said device comprising a base carrying a rod extending upwardly from an upper horizontal face thereof on which a plurality of the rings to be dispensed may be arranged in vertical stack formation, said upper face including a portion of greater elevation from which the stack rod extends and an adjacent portion of lesser elevation, the difference between said elevations substantially equaling the thickness of a single retaining ring, a slide mounted for sliding movement on the portion of greater elevation and being disposed intermediate said portion and said ring stack and including an end portion having a ring accommodating opening which is normally disposed over said face portion of lesser elevation, spring means normally biasing the slide positioned as aforesaid, said tool including a pair of resiliently interconnected jaws defining a ring receiving recess and a ring backing flange extending along the recess and inwardly over a face of a ring received in said recess, said slide being actuable to a retracted position by said tool upon movement of the tool with its backing flange disposed upwardly along the face portion of lesser elevation into engagement with said slide, the construction and arrangement being such that responsive to movement of the tool as aforesaid the slide moves to a retracted position in which its ring accommodating opening is vertically aligned with the ring stack as permits lowering of the lowermost ring of the stack on to said face of greater elevation, and that responsive to the tool being withdrawn from such engagement the slide under the urge of said spring means pushes said lowermost ring on to said face portion of lesser elevation.

4. Apparatus as set forth in claim 3, wherein said face portions of greater and lesser elevation constitute the stepped bottom wall of a slideway formed in the upper face of said base, and which defines predetermined paths of movement of said slide and said tool.

References Cited in the file of this patent

UNITED STATES PATENTS

| | | |
|---|---|---|
| 2,303,005 | Swangren | Nov. 24, 1942 |
| 2,483,379 | Brell | Sept. 27, 1949 |
| 2,650,722 | Stabile | Sept. 1, 1953 |